Oct. 11, 1927.
G. D. JONES
1,644,885
TRACTOR PROPELLED IMPLEMENT
Original Filed Nov. 8, 1920    2 Sheets-Sheet 1
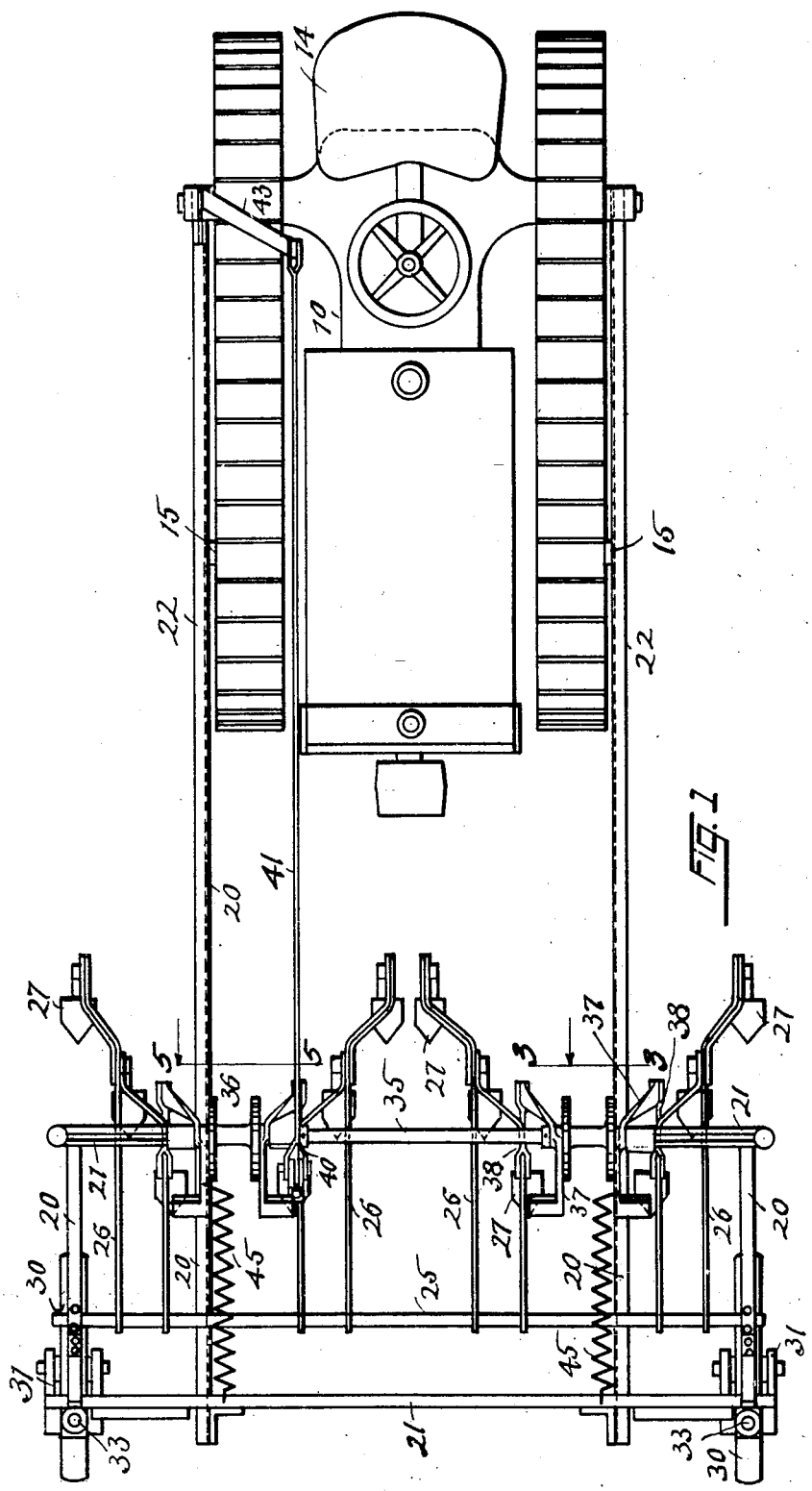
Inventor
George Douglas Jones
By Thurston Kwis + Audem
Attorneys.

Oct. 11, 1927.   1,644,885
G. D. JONES
TRACTOR PROPELLED-IMPLEMENT
Original Filed Nov. 8, 1920   2 Sheets-Sheet 2
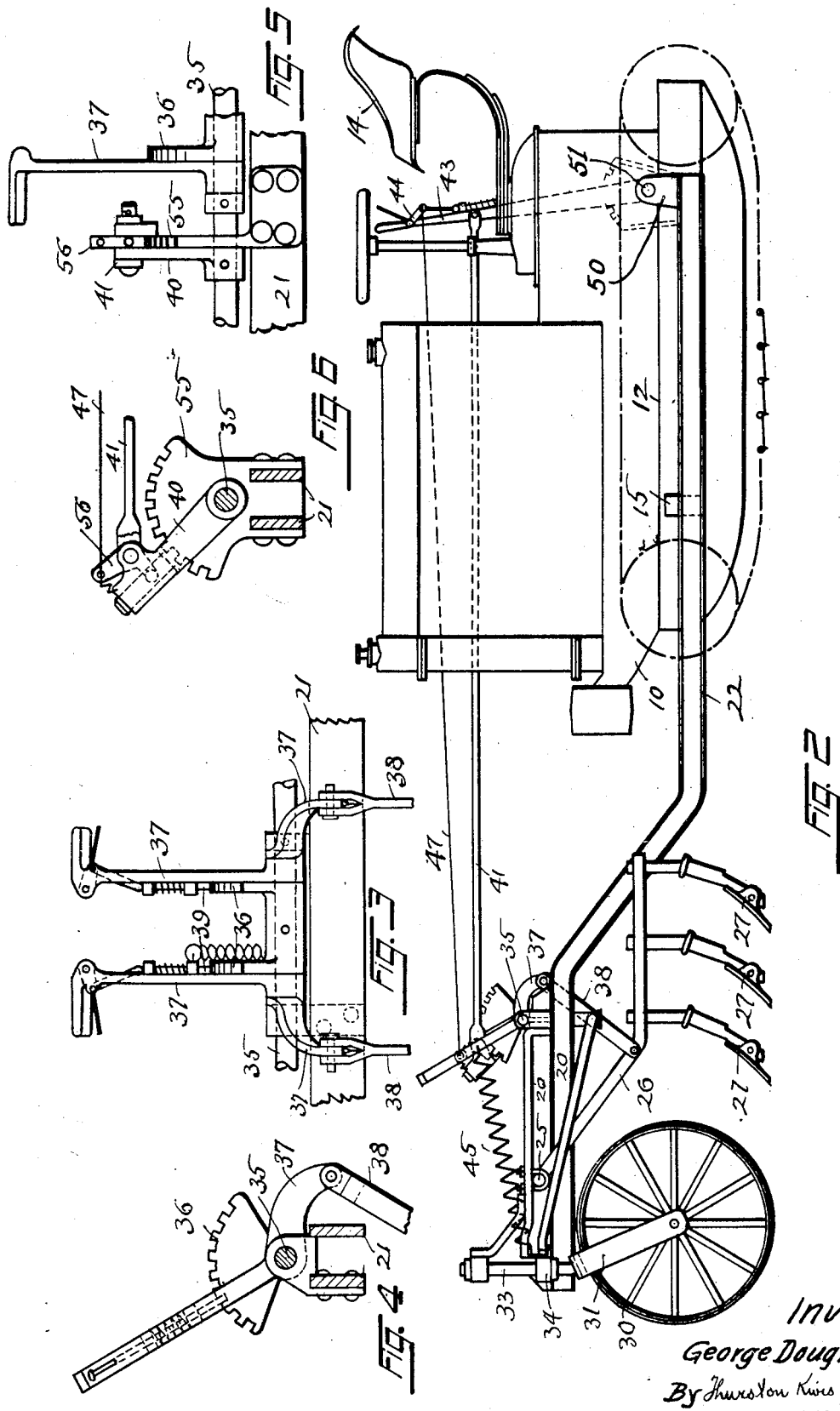
Inventor
George Douglas Jones
By Thurston Kwis &Hudson
Attorneys.

Patented Oct. 11, 1927.

1,644,885

UNITED STATES PATENT OFFICE.

GEORGE DOUGLAS JONES, OF EAST CLEVELAND, OHIO, ASSIGNOR TO THE CLEVELAND TRACTOR COMPANY, OF EUCLID, OHIO, A CORPORATION OF OHIO.

TRACTOR-PROPELLED IMPLEMENT.

Application filed November 8, 1920, Serial No. 422,535. Renewed April 22, 1927.

It is common practice, in using tractors as substitutes for horses, to hitch the rear end of the tractor to the front end of the implement so that the tractor will pull the implement along after it. This practice is objectionable for a number of reasons, among which are the following:

It usually requires two men, one to drive the tractor and one to control the operations of the implement. It is difficult to cause the implement to go exactly where it should because it usually has no independent steering mechanism, and, while it must follow after the tractor, it nevertheless has considerable liberty of independent lateral movement over which the driver of the tractor can not exercise much control because, being in front of the implement, he can not see exactly what the implement is doing. Moreover, if by looking backward he can see just where the implement ought to go his control over the implement is not complete enough to enable him to make the implement go just where he wants it to.

The object of the present invention is to enable the implement to be put in front of the tractor; and to so connect them that a single person, sitting on the driving seat of the tractor, may control its movements, and may see where the implement is going, and may accurately guide it as well as the tractor in order that it may properly perform its function without injury to the growing crops.

In the drawing, Fig. 1 is a plan view of an embodiment of my invention; Fig. 2 is a side elevation thereof. These views are rather diagrammatic in so far as concerns the mechanisms shown clearly in the other figures for controlling the position of the cultivator hoes. Fig. 3 is a front end elevation of the means by which the hoe beams may be operated independently, or connected with a common operating element, to wit, a rock shaft; Fig. 4 is a sectional side view of the mechanism shown in Fig. 3; Fig. 5 is a fragmentary front elevation showing a part of the means for rocking and locking the rock shaft 35; and Fig. 6 is a side elevation of some of the mechanism shown in Fig. 5.

For the purpose of conveying an understanding of my invention, I illustrate in the drawings a tractor of the track laying type, in which there is a main motor supporting frame 10 and an endless track structure on each side thereof, each endless track structure including a track frame 12; said two track frames supporting the front end of the main frame 10 in a conventional manner and being pivotally connected near their rear ends on aligned axes to the main frame; reference may be had to the reissued patent to Rollin H. White, No. 14,938, dated August 24, 1920, as illustrating a tractor of this type, which may be employed in carrying out my invention. Tractors of the track laying type are steered by causing the two track belts to travel at the same or at different rates, as may be required.

The implement shown is specifically a cultivator; and possibly the invention is most useful when the implement is of the cultivator type, because implements of this type are used in fields in which a crop is growing; and it is essential that the cultivator in turning up the earth shall not injure the growing crop. But it is not the intention that the appended claims shall be limited to an implement of the cultivator type nor even to farm implements unless such limitation is plainly expressed.

The implement has a rigid frame which includes longitudinally extended bars 20 and cross bars 21 connected to them. Rigid with this frame are two long rearwardly extended bars 22 which may be, as shown, long rearward extensions of two of the longitudinal frame beams 20. These beams 22 are spaced apart such a distance as that the tractor may go between them. To the rear ends of said bars are secured brackets 50 which are connected and preferably pivotally connected to the axle 51 projecting from each side of the tractor body. The track mechanisms at each side are also pivoted to axle 51 and are within the bars 22. Fixed to the track frames are plates 15 against the outer faces of which the two beams 22 respectively engage, and with which they have a rubbing contact when the described combination of tractor and implement is in use on a field which, like most fields, has a rough surface which imparts to the implement frame such an up and down movement relatively to the tractor as that the bars 22 must swing upon their rear pivots.

The front end of the cultivator frame is supported by two wheels 30 each of which is mounted in a fork 31 having a vertical stem 33 which is rotatably mounted in bearings 34 fixed respectively to the front end of the machine adjacent the corners thereof. Each of these pivotally connected forks is free to turn about the axis of the stem 33, and therefore the wheels have an independent castor-like action, wherefore these frame supporting wheels will offer no material resistance to those lateral movements of the cultivator frame which must take place when the tractor changes its direction of motion.

In operating the described combined machine, the driver sitting on the seat 14, controls the tractor in the usual way and steers it to the right or left, as may be required to accurately guide it. The steering of the tractor causes a corresponding but somewhat greater like lateral movement of the implement, because the connection between the tractor and the two rearwardly extended bars of the implement is such that no lateral movement of the bars relative to the tractors is permitted, the rear end of said bars being as stated pivoted to the tractor frame, and the plates 15 on the tractor side frames engaging with the inner faces of these two side bars whose front ends are connected against relative movement by the transverse members of the implement frame.

As before stated, the implement shown is a cultivator, which includes a transverse non-rotatable shaft 25. A plurality of hoe frame bars 26 are pivotally mounted on this transverse bar and extend rearwardly and downwardly therefrom, each of said hoe frames having a plurality of hoes 27 fixed to them. The implement also includes a transversely extended rock shaft 35 on which a plurality of segment racks 36 are secured, there being one for each of the hoe frames. Associated with each of the hoe frames is a bell crank lever 37 which is rotatably supported on shaft 35 and is connected by a link 38 with the associated hoe frame. By rocking any lever 37 upon rock shaft 35 the associated hoe frame may be raised or lowered as desired. When this hoe frame is in the proper position a latch 39 carried by the lever may be made to engage with the adjacent segment rack 36 so as to connect said lever with the rock shaft 35. When all of the hoe frames are so connected with the rock shaft 35 it is evident that by the rocking of the rock shaft all of said hoe frames may be raised or lowered simultaneously. In order to rock the rock shaft, a lever arm 40 may be secured to the rock shaft and may be connected by rod 41 with a lever 43 pivoted to the tractor frame within easy reach of the driver sitting on the seat 14. Two springs 45 each of which is connected at its front end with the transverse frame member 21 and at its rear end with one of the levers 37, act to rock the rock shaft 35 in that direction which causes the hoes to be raised above the ground. To force all of the hoes down into the ground the operator pulls back on lever 43, thereby rocking the rock shaft 35. A segment rack 55 is fixed to a frame member 21, in position to be engaged by a latch 56 carried by lever 40, in order that the rock shaft 35 may be held in any position to which it may be moved. A latch lever 44 mounted on lever 43 is connected by a wire 47 with the latch 45, which enables the driver of the tractor to release the latch 45.

Having described my invention, I claim:—

1. The combination of a tractor, an implement, said implement having a frame including a pair of beams extending rearwardly on each side of said tractor substantially the length thereof and pivotally connected at their rear ends with the tractor, means extending from said tractor and engaging said beams to prevent independent lateral movement of said implement frame relative to said tractor, and caster wheels carried by the front end of the implement frame for supporting the same.

2. The combination of a tractor, an implement having a rigid frame including a pair of beams extending rearwardly on each side of said tractor substantially the length thereof and pivoted adjacent the rear end thereof, means extending from the tractor to prevent relative lateral movement of said frame, and ground engaging means for supporting the forward end of said implement frame.

3. In combination with a track-laying tractor having a main frame, an axle, and track carrying side frames; a separate implement frame supported at its forward end in advance of said tractor by caster wheels, said implement frame being pivotally connected to said axle.

4. In combination, a track-laying tractor of the type steered by varying the relative rates of movement of the tracks thereof, an implement positioned forwardly of the tractor, a separate ground engaging support for said implement, and push rod means connecting the implement and tractor, making a vertical swiveling connection with the tractor at the sides and towards the rear thereof, but restrained from lateral movements relative thereto.

5. The combination with a tractor having a rearwardly disposed driving wheel disposed at each side thereof, and controlling means to vary the tractive effort imparted to the tractor by said wheels, the tractor making ground engaging contact in its rear portion adjacent the wheels, of an implement disposed forwardly of the tractor, and push bar means interconnecting the implement and the tractor and making a vertically swiveling connection with the tractor adjacent its rear end.

6. A tractor of the track-laying type supported upon and driven by endless track units pivotally connected thereto and steered by varying the relative driving action of the track units, an implement carrying frame extending forwardly of the tractor, said frame and said track units being each independently vertically swivelable in radial relation to each other and ground engaging means supporting said implement frame in advance of said tractor, said implement carrying frame being pushed and steered by said tractor as a combined unit.

7. A tractor of the track-laying type supported upon and driven by endless track units pivotally connected thereto and steered by varying the relative driving action of the track units, an implement carrying frame extending forwardly of the tractor, said frame and said track units being each independently vertically swivelable in radial relation to each other, and caster wheel ground engaging means supporting said implement frame in advance of said tractor, said implement carrying frame being pushed and steered by said tractor as a combined unit.

In testimony whereof, I hereunto affix my signature.

GEORGE DOUGLAS JONES.